United States Patent
Fukuda et al.

(10) Patent No.: US 6,921,162 B2
(45) Date of Patent: Jul. 26, 2005

(54) INK USED IN INKJET RECORDING, METHOD FOR INKJET RECORDING, INKJET RECORDING HEAD AND MANUFACTURING METHOD THEREFOR, METHOD FOR TREATING INKJET RECORDING HEAD, AND INKJET PRINTER

(75) Inventors: Toshio Fukuda, Kanagawa (JP); Yasuhiro Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/627,514

(22) Filed: Jul. 25, 2003

(65) Prior Publication Data

US 2004/0145640 A1 Jul. 29, 2004

(30) Foreign Application Priority Data

Jul. 30, 2002 (JP) .................................. 2002-220681
Sep. 3, 2002 (JP) .................................. 2002-257474

(51) Int. Cl.$^7$ .............................. B41J 2/17; B41J 2/135
(52) U.S. Cl. .............................. 347/95; 347/45; 347/96
(58) Field of Search ........................ 347/95, 96, 100, 347/44, 54, 45, 47, 68, 101, 63; 106/31.13, 31.27; 523/160

(56) References Cited

U.S. PATENT DOCUMENTS

| | | | | |
|---|---|---|---|---|
| 4,960,684 A | * | 10/1990 | Ishikawa et al. | 430/467 |
| 6,383,275 B1 | * | 5/2002 | Lin | 106/31.27 |
| 6,770,331 B1 | * | 8/2004 | Mielke et al. | 347/100 |

* cited by examiner

Primary Examiner—Manish S. Shah
(74) Attorney, Agent, or Firm—Robert J. Depke; Trexler, Bushnell, Giangiorgi, Blackstone & Marr

(57) ABSTRACT

A surface treating solution use in thermal inkjet recording contains a organic phosphonic compound represented by the formula:

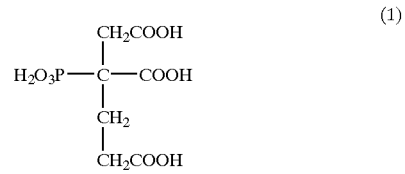

The inkjet recording head is treated with the organic phosphonic compound represented by formula (1) so that the surface of a heater device of the inkjet recording head is treated with the organic phosphonic compound represented by formula (1).

2 Claims, 3 Drawing Sheets

INK USED IN INKJET RECORDING, METHOD FOR INKJET RECORDING, INKJET RECORDING HEAD AND MANUFACTURING METHOD THEREFOR, METHOD FOR TREATING INKJET RECORDING HEAD, AND INKJET PRINTER

BACKGROUND OF THE INVENTION

1. Field of the Invention

The present invention relates to ink for ink-jet recording containing dye and water, an inkjet recording method, an inkjet recording head and a manufacturing method therefor, and an inkjet printer. In particular, the present invention relates to ink for inkjet recording and an ink-jet recording head that can greatly suppress the kogation phenomenon peculiar to thermal inkjet printers.

2. Description of the Related Art

Recently, the need for color hard copies has increased significantly in the field of image processing. Various methods for producing color hard copies have been developed. Examples thereof include dye-sublimation recording, thermal wax transfer recording, inkjet recording, electrophotographic recording, and thermally processed silver recording.

In inkjet printing, ink droplets are ejected from aligned nozzles of an inkjet recording head of an ink-jet printer onto a recording medium such as paper. The ejected droplets form points called "dots" to create characters and images. The advantages of inkjet printing over other printing methods are its low cost, high quality, and ability to easily produce color images. Ink used in inkjet printing is prepared by dissolving or dispersing a water-soluble dye or pigment into a solvent containing water and water-soluble organic solvent. An additive such as a surfactant may be added if necessary.

Inkjet printing can be classified according to the method of ejecting ink droplets: piezoelectric methods in which piezoelectric devices are used to eject ink and thermal methods in which heater devices are used to eject ink.

According to the thermal printing method, ink contained in a reservoir of an inkjet recording head is locally heated by a heater device to generate bubbles and to thereby discharge ink droplets from the reservoir through orifices, such as nozzles, onto a recording medium. A thermal-type printer thus has an inkjet recording head that includes a heater device for heating ink, the heater device being installed inside the reservoir, and a driving circuit for driving the heater device, such as a logic integrated circuit.

However, when conventional ink for use in ink-jet recording is used in the thermal inkjet printer, foreign matter such as impurities, e.g., metal ions introduced during synthesis of the dye, or thermal decomposition products deposit on the surface of the heater device as the inkjet printer is used. This phenomenon is called "kogation". Kogation causes local heating of ink to become insufficient, inhibits generation of bubbles, decreases the discharge rate of the ink, and adversely affect discharge of ink droplets.

One proposed technique for preventing kogation is to remove from the dye impurities such as metal ions introduced during synthesis of the dye. However, thermal decomposition of the dye in the ink is inevitable. Even when impurities such as metal ions are removed by purifying the ink, deposition of the decomposition products of the dye onto the heater device cannot be prevented. Thus, kogation cannot be completely prevented according to this technique.

According to the conventional technology, kogation cannot be completely prevented as long as ink containing dye, water, and an organic solvent is used in the ink-jet recording, as described above.

SUMMARY OF THE INVENTION

The present invention aims to overcome the above-described problems of the conventional art by providing an ink for use in inkjet recording and an inkjet recording head that can prevent the kogation and eject ink droplets from the printer head smoothly for a long time when they are used in thermal inkjet printing.

The Inventors have found that kogation can be prevented by adding a particular phosphonic acid compound to the ink for inkjet recording and made the present invention.

A first aspect of the present invention provides an ink for use in inkjet recording, the ink containing a dye; water; and an organic phosphonic compound represented by the formula:

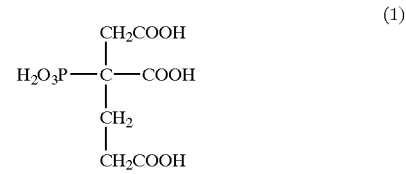

(1)

A second aspect of the present invention provides a method for inkjet recording including a step of ejecting an ink containing a dye and water from a nozzle onto a recording medium to form an image on the recording medium, wherein the ink contains an organic phosphonic compound represented by the formula (1) above.

The Inventors have also found that the above-described object can be achieved by treating the surface of the heater device of the inkjet recording head with the above-described particular organic phosphonic compound.

In particular, a third aspect of the present invention provides an inkjet recording head having a reservoir for accommodating an ink, a heater device, and a nozzle, the inkjet recording head capable of ejecting the ink in the reservoir from the nozzle by the heat applied from the heater device, the heater device having a surface treated with an organic phosphonic compound represented by the formula (1) above.

A fourth aspect of the present invention provides a method for making an inkjet recording head having a reservoir for accommodating an ink, a heater device, and a nozzle, the inkjet recording head capable of ejecting the ink in the reservoir from the nozzle by the heat applied from the heater device, the method including the steps of introducing a surface-treating solution containing an organic phosphonic compound into the reservoir so as to put the heater device in contact with the surface-treating solution, the organic phosphonic compound being represented by the formula (1) above; and heating the heater device so that the surface of the heater device is treated with the organic phosphonic compound.

A fifth aspect of the present invention provides a method for treating an inkjet recording head having a reservoir for accommodating an ink, a heater device, and a nozzle, the inkjet recording head capable of ejecting the ink in the reservoir from the nozzle by the heat applied from the heater device, the method including the steps of introducing a surface-treating solution containing an organic phosphonic compound into the reservoir not filled with the ink so as to put the heater device in contact with the surface-treating solution, the organic phosphonic compound being represented by the formula (1); and heating the heater device so that the surface of the heater device is treated with the organic phosphonic compound.

A sixth aspect of the present invention provides an inkjet printer having any one of the inkjet recording heads described above.

DESCRIPTION OF THE PREFERRED EMBODIMENTS

First Embodiment

Figure 1:
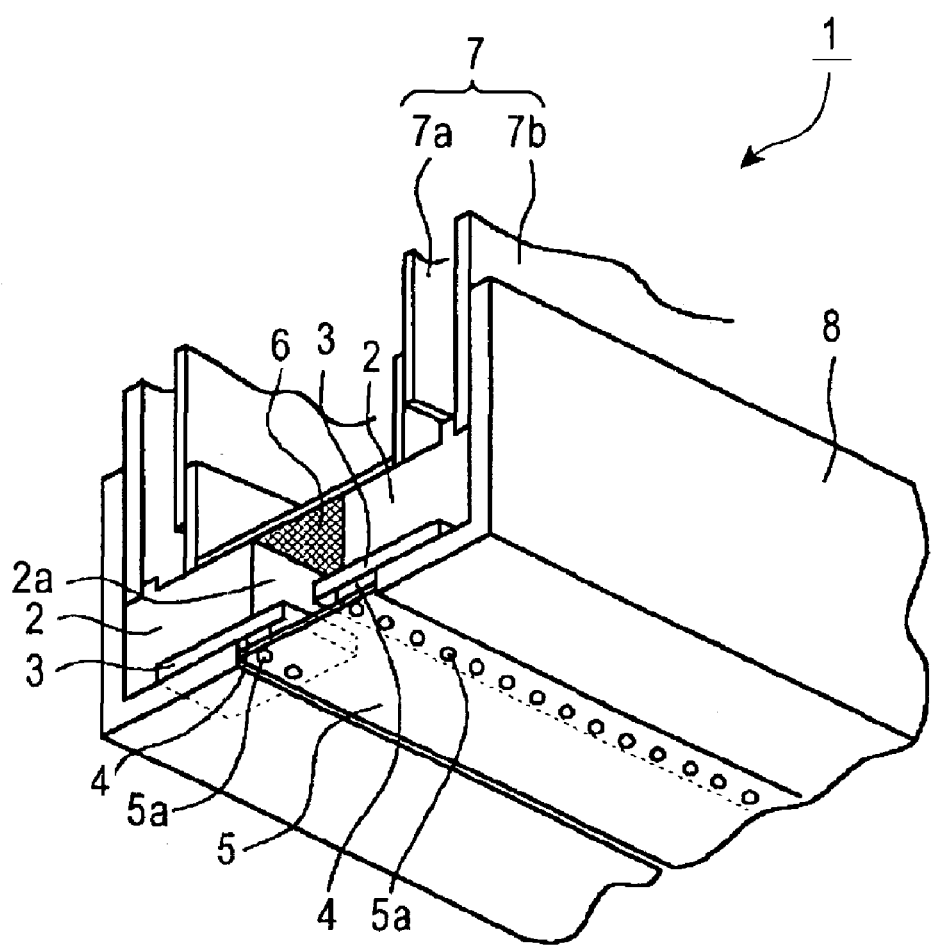
FIG. 1 is a perspective view of an example inkjet recording head of the present invention.

Ink containing at least a dye and water for use in inkjet recording according to a first embodiment of the present invention will now be described. The ink is characterized in that it contains an organic phosphonic compound represented by formula (1):

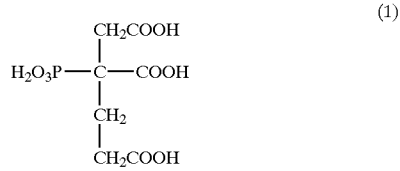

(1)

The ink containing the phosphonic compound (1) can prevent kogation and deposition of impurities onto the heater device. Thus, ink droplets can be smoothly discharged onto a recording media for a long time without decreasing the rate of discharging ink from the inkjet print head, thereby achieving high recording quality. The exact reason for this is not yet known. It is presumed that the organic phosphonic compound (1) deposits on the surface of the heater device to form a coating, and this coating prevents deposition of foreign matter such as decomposition products of the dye and impurities.

In this invention, the amount of the organic phosphonic compound of formula (1) in the ink is preferably in the range of 0.01 to 10 percent by weight, and more preferably 0.5 to 5 percent by weight. When the amount of the organic phosphonic compound is below this range, kogation cannot be fully prevented. When the amount of the organic phosphonic compound is above this range, the ink becomes excessively viscous, and ink may not be smoothly discharged from the nozzles of the inkjet head.

Any conventional water-soluble dye, such as a direct dye, an acid dye, and a reactive dye, used in inkjet printing may be used. In particular, preferable examples of yellow direct dye include C.I. Direct Yellows 1, 8, 11, 12, 24, 26, 27, 28, 33, 39, 44, 50, 58, 85, 86, 87, 88, 89, 98, 100, and 110; preferable examples of magenta direct dye include C.I. Direct Reds 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 321; preferable examples of cyan direct dye include C.I. Direct Blues 1, 2, 6, 8, 15, 22, 25, 41, 71, 76, 77, 78, 80, 86, 90, 98, 106, 108, 120, 158, 160, 163, 165, 168, 192, 193, 194, 195, 196, 199, 200, 201, 202, 203, 207, 225, 226, 236, 237, 246, 248, and 249; and preferable examples of black direct dye include C.I. Direct Blacks 17, 19, 22, 32, 38, 51, 56, 62, 71, 74, 75, 77, 94, 105, 106, 107, 108, 112, 113, 117, 118, 132, 133 and 146.

Preferred examples of yellow acid dye include C.I. Acid Yellows 1, 3, 7, 11, 17, 19, 23, 25, 29, 36, 38, 40, 42, 44, 49, 59, 61, 70, 72, 75, 76, 78, 79, 98, 99, 110, 111, 112, 114, 116, 118, 119, 127, 128, 131, 135, 141, 142, 161, 162, 163, 164, and 165; preferred examples of magenta acid dye include C.I. Acid Reds 1, 6, 8, 9, 13, 14, 18, 26, 27, 32, 35, 37, 42, 51, 52, 57, 75, 77, 80, 82, 83, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 199, 209, 211, 215, 216, 217, 219, 249., 252, 254, 256, 257, 262, 265, 266, 274, 276, 282, 283, 303, 317, 318, 320, 321, and 322; preferred examples of cyan acid dye include C.I. Acid Blues 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 175, 182, 183, 184, 187, 192, 199, 203, 204, 205, 229, 234, and 236; preferred examples of black acid dye include C.I. Acid Black 1, 2, 7, 24, 26, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191.

The amount of the dye is not limited. In general, 0.1 to 15 percent by weight of the dye is preferably contained in the ink for inkjet recording.

The ink of the present invention contains water as the solvent. In addition, a water-soluble organic solvent may be contained in the ink. Examples of the water-soluble organic solvent include aliphatic monohydric alcohol, polyhydric alcohol, and derivatives of polyhydric alcohol. Aliphatic monohydric alcohol can control the surface tension of the ink and improves the permeability on a recording medium, such as plain paper or special paper, the ability to form dots, and the drying properties of printed images. Polyhydric alcohol and derivatives thereof are not easily evaporated and lower the freezing point of the ink, thereby improving preservation stability of the ink and preventing clogging of nozzles.

Examples of aliphatic monohydric alcohol include lower alcohols such as methyl alcohol, ethyl alcohol, n-propyl alcohol, i-propyl alcohol, n-butyl alcohol, s-butyl alcohol, and t-butyl alcohol. In particular, ethyl alcohol, i-propyl alcohol, and n-butyl alcohol are preferred.

Examples of polyhydric alcohol include alkylene glycols such as ethylene glycol, diethylene glycol, triethylene glycol, propylene glycol, butylene glycol, and glycerol; polyalkylene glycols such as polyethylene glycol and polypropylene glycol; and thiodiglycol.

Examples of the polyhydric alcohol derivatives include lower alkyl ethers of the above-described polyhydric alcohols, such as ethylene glycol dimethyl ether, and lower carboxylate esters of the above-described polyhydric alcohols, such as ethylene glycol diacetate.

The ink for inkjet recording according to the present invention may additionally contain an additive such as a surfactant, a pH modifier, an antiseptic, a chelating agent, or the like.

The ink for inkjet recording according to the present invention can be prepared by uniformly blending a dye, water, a water-soluble organic solvent (optional), and the like by a conventional technique.

Since the ink of the invention can suppress kogation, it is suitable for use in an inkjet recording method for creating images on a recording medium, the method in which ink is ejected from nozzles of an inkjet head of a conventional thermal inkjet printer that uses thermal energy to eject ink. The ink can be used in an inkjet recording method that uses a piezoelectric inkjet printer including a piezoelectric device.

EXAMPLES

The first embodiment of the invention will now be described in detail by way of EXAMPLES. In the EXAMPLES and COMPARATIVE EXAMPLES below, the amount of the organic phosphonic compound represented by formula (1) in the ink for inkjet recording is adjusted on a solid content basis.

Examples 1 to 3

The materials shown in each of Tables 1 to 3 were thoroughly blended by a mixer to prepare EXAMPLES 1 to 3 of ink for inkjet recording.

TABLE 1

Composition of ink of EXAMPLE 1

| Component | wt % |
|---|---|
| Dye (Magenta VPSP25005, manufactured by Bayer) | 4 |
| Organic solvent: | |
| ethylene glycol | 10 |
| diethylene glycol | 10 |
| Organic phosphonic compound of formula (1) (Bayhibit AM, manufactured by Bayer) | 0.01 |
| Water | 75.99 |

TABLE 2

Composition of ink of EXAMPLE 2

| Component | wt % |
|---|---|
| Dye (Magenta VPSP25005, manufactured by Bayer) | 4 |
| Organic solvent: | |
| ethylene glycol | 5 |
| diethylene glycol | 5 |
| glycerol | 10 |
| Organic phosphonic compound of formula (1) (Bayhibit AM, manufactured by Bayer) | 5 |
| Water | 71 |

TABLE 3

Composition of ink of EXAMPLE 3

| Component | wt % |
|---|---|
| Dye (Acid Red 289 (J-41A, manufactured by Nippon Kayaku Co., Ltd.)) | 4 |
| Organic solvent: | |
| ethylene glycol | 5 |
| diethylene glycol | 5 |
| glycerol | 10 |
| Organic phosphonic compound of formula (1) (Bayhibit AM, manufactured by Bayer) | 0.5 |
| Water | 75.5 |

Example 4

Ink for inkjet recording was prepared by uniformly mixing 99 parts by weight of a commercially available ink for inkjet recording (PM 800C magenta ink, available from Seiko Epson Corporation) and 1 part by weight of the organic phosphonic compound of formula (1) (Bayhibit AM, manufactured by Bayer) using a mixer.

Comparative Examples 1 to 3

The materials shown in each of Tables 4 to 6 were thoroughly blended by a mixer to prepare COMPARATIVE EXAMPLES 1 to 3 of ink for inkjet recording.

TABLE 4

Composition of ink of COMPARATIVE EXAMPLE 1

| Component | wt % |
|---|---|
| Dye (Magenta VPSP25005, manufactured by Bayer) | 4 |
| Organic solvent: | |
| ethylene glycol | 10 |
| diethylene glycol | 10 |
| Water | 76 |

TABLE 5

Composition of ink of COMPARATIVE EXAMPLE 2

| Component | wt % |
|---|---|
| Dye (Magenta VPSP25005, manufactured by Bayer) | 4 |
| Organic solvent: | |
| ethylene glycol | 5 |
| diethylene glycol | 5 |
| glycerol | 10 |
| Water | 76 |

TABLE 6

Composition of ink of COMPARATIVE EXAMPLE 3

| Component | wt % |
|---|---|
| Dye (Acid Red 289 (J-41A, manufactured by Nippon Kayaku Co., Ltd.)) | 4 |
| Organic solvent: | |
| ethylene glycol | 5 |
| diethylene glycol | 5 |
| glycerol | 10 |
| Water | 76 |

Comparative Example 4

Ink for inkjet recording was prepared by uniformly mixing 99 parts by weight of a commercially available ink for inkjet recording (PM 800C magenta ink, available from Seiko Epson Corporation) and 1 part by weight of water using a mixer.

Evaluation

Each ink of EXAMPLES 1 to 4 and COMPARATIVE EXAMPLES 1 to 4 was loaded into an inkjet printer (nozzle diameter: 20 μm, driving voltage: 11 V) having a heater device (a resistor having a resistance of 135 Ω), and was ejected onto plain paper for 100,000,000 pulses at a driving frequency of 10 kHz. The rate of ejecting ink droplets at an early stage of the ejection and that after 100,000,000 pulses were determined so as to calculate the change in ejection rate, i.e., a decrease in ejection rate (%). The results are shown in Table 7.

The surface of the heater device after 100,000,000 pulses of ejection was observed with an optical microscope to inspect the presence of deposits, i.e., the state of kogation. The state in which substantially no deposits were found on the heater device surface was rated "A". The state in which few deposits were found on the surface was rated "B". The state in which a substantial amount of deposits were found on the surface was rated "C". The ratings are shown in Table 7. The thickness of the deposits on the surface of the heater device was determined with a color laser microscope (trade name: VK-8500, available from Keyence Corporation). The results are shown in Table 7.

TABLE 7

|  | Decrease in ejection rate (%) | State of kogation | Deposits thickness ($\mu$m) |
| --- | --- | --- | --- |
| EXAMPLE 1 | 18 | B | 0.78 |
| EXAMPLE 2 | 2 | A | 0.10 |
| EXAMPLE 3 | 8 | A | 0.49 |
| EXAMPLE 4 | 4 | A | 0.15 |
| COMPARATIVE EXAMPLE 1 | at least 50 | C | 1.3 |
| COMPARATIVE EXAMPLE 2 | at least 50 | C | 1.25 |
| COMPARATIVE EXAMPLE 3 | 25 | C | 0.9 |
| COMPARATIVE EXAMPLE 4 | Undetectable | C | 1.7 |

As shown in Table 7, when the ink of EXAMPLES 1 to 4 containing the organic phosphonic compound of formula (1) was used in thermal inkjet printing, the decrease in ejection rate after 100,000,000 pulses was less than 20%. This rate is sufficient for practical applications. The thickness of the deposits on the surface of the heater device was less than 0.8 $\mu$m, indicating that the amount of deposits on the surface of the heater device was dramatically small. In particular, only small amounts of deposits were observed in EXAMPLE 1. Substantially no deposits were observed in EXAMPLES 2, 3, and 4. In EXAMPLES 2, 3, and 4, the surface of the heater device was colored.

In contrast, when the ink of COMPARATIVE EXAMPLES 1 to 4 was used, the decrease in ejection rate after 100,000,000 pulses exceeded 20%, and the ink was thus not suitable for practical applications. The thickness of the deposits on the surface of the heater device exceeded 0.8 $\mu$m in all cases, indicating that the amount of deposits was significantly large. In particular, in COMPARATIVE EXAMPLE 4, ink could not be ejected due to extensive kogation and a large amount of deposits was observed on the surface of the heater device of the nozzle of the printer.

The above results clearly demonstrate that the ink containing the organic phosphonic compound of formula (1) can prevent kogation, i.e., the deposition of foreign matter on the surface of the heater device, when the ink is used in a thermal inkjet printer head.

A second embodiment of the present invention will now be described in detail with reference to FIGS. 1 to 3. The second embodiment of the present invention is a process for treating the surface of a heater device of an ink-jet printing head using the above-described organic phosphonic compound.

Figure 2:
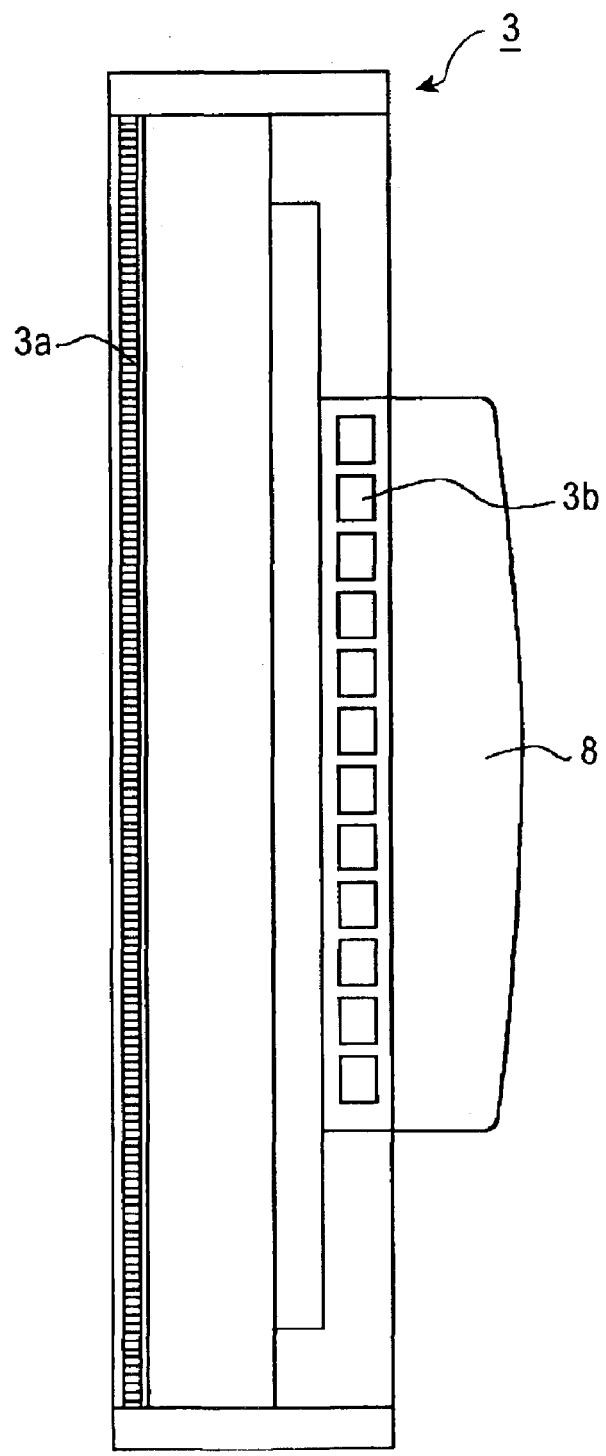
FIG. 2 is a partial enlarged view of the example inkjet recording head of the present invention.

FIG. 1 is a perspective view of an example thermal-type inkjet recording head 1. The inkjet recording head 1 has a head frame 2 having an ink-supply slit 2a at the center. A plurality of head chips 3 constituted from Si substrates are affixed onto one face of the head frame 2. In particular, the head chips 3 are arranged on the head frame 2 and at two sides of the ink-supply slit 2a. As shown in FIG. 2, each of the head chips 3 has a plurality of heater devices 3a, which is aligned in a row, along one side adjacent to the ink-supply slit 2a, and a plurality of connecting terminals 3b corresponding to the heater devices 3a along the other side remote from the ink-supply slit 2a. The connecting terminals 3b are also aligned in a row.

Figure 3:
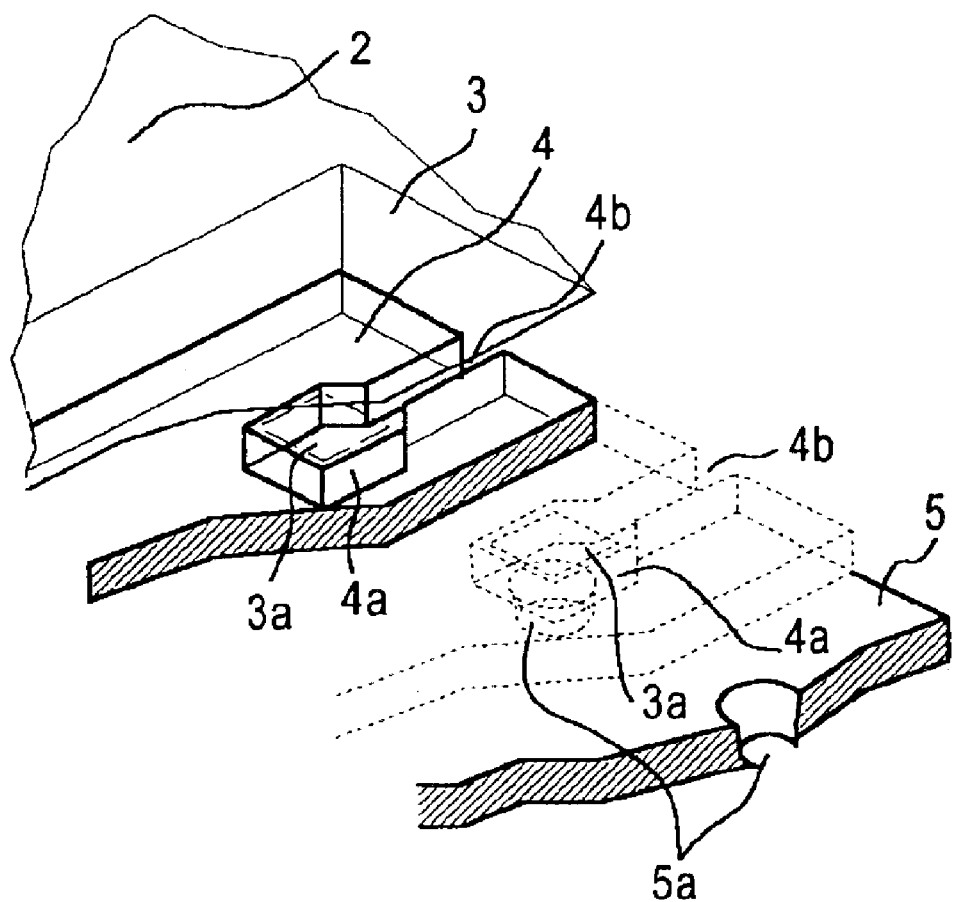
FIG. 3 is a partial enlarged perspective view of the example inkjet recording head of the present invention.

Referring now to FIG. 3, a reservoir component 4 for forming a plurality of ink reservoirs 4a and ink paths 4b is disposed on the head chip 3. A nozzle plate 5 having a plurality of nozzles 5a is disposed on the reservoir component 4. The reservoir component 4 is formed with a photosensitive resin such as dry film photoresist. The ink reservoirs 4a correspond to the heater devices 3a aligned in the head chip 3. Each ink path 4b extends from the corresponding ink reservoir 4a to the end of the head chip 3.

The nozzle plate 5 is prepared by electroforming, for example. Typically, the nozzle plate 5 is plated with gold or palladium to enhance corrosion resistance. The nozzle plate 5 covers the ink-supply slit 2a, and the nozzles 5a of the nozzle plate 5 are arranged in one-to-one correspondence with the heater devices 3a. In this manner, each ink reservoir 4a becomes connected to the corresponding ink path 4b and to the corresponding nozzle 5a of the nozzle plate 5.

An ink tank 7 is attached to the other face of the head frame 2 with a filter 6 therebetween. The filter 6 covers the ink-supply slit 2a to prevent aggregates of foreign matter and ink components in the ink tank 7 from entering the nozzles 5a. The ink tank 7 has a double structure consisting of a bag 7a and a casing 7b.

A spring (not shown) is disposed between the bag 7a and the casing 7b to extend the bag 7a. In this manner, a negative pressure is applied to the ink, thereby preventing spontaneous leakage of the ink from the nozzles 5a. Since the negative pressure is controlled to be smaller than the capillary force of the nozzles 5a, the ink is prevented from being drawn into the nozzles 5a.

Electrical wiring 8 is provided on the head chip 3, outer sides of the head frame 2, and the external peripheral faces of the ink tank 7. The electrical wiring 8 is, for example, a flexible printed circuit board (FPC). The electrical wiring 8 provides power and electric signals to the head chip 3 and is connected to the connecting terminals 3b of the head chip 3.

Each of the heater devices 3a is prepared by depositing a resist material, such as tantalum, tantalum aluminum, or titanium nitride, on a predetermined substrate by a sputtering method commonly employed in semiconductor manufacturing processes, forming Al electrode or the like on the deposited resist material, and forming a protective layer, such as silicon nitride film, thereon. A cavitation-resistant layer composed of tantalum or the like, the ink reservoirs 4a, and the nozzles 5a are formed on the top of the protective layer so that the ink inside the ink reservoirs 4a can be heated by the heater devices 3a. In the inkjet recording head 1 made as above, power is supplied to the heater devices 3a from metal oxide semiconductor (MOS) transistors or bipolar transistors using a particular driving circuit so as to eject ink droplets onto a recording medium.

Each of the heater devices 3a of the inkjet recording head 1 described above has a surface treated with the organic phosphonic compound having an anticorrosion effect represented by formula (1):

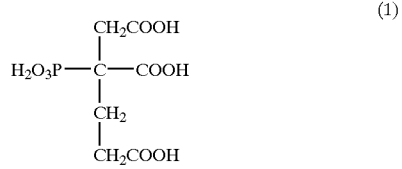

(1)

In this manner, foreign matter such as decomposition products of dye contained in the ink rarely deposit on the surface of the heater device 3a. Even when the ink is heated and foreign matter such as decomposition products of the dye and impurities is produced as a result, deposition of the foreign matter on the surface of the heater device 3a and kogation can be prevented. Thus, a high rate of ink ejection can be maintained for a long time, and high quality recording is achieved since ink droplets can be ejected smoothly. The reason behind such improvements is not precisely known. Presumably, the organic phosphonic compound of formula (1) forms a coating on the surface of the heater device 3a to enhance corrosion resistance.

In particular, the inkjet recording head 1 of the present invention is prepared as follows. A surface-treating solution containing the organic phosphonic compound of formula (1) is introduced to the ink reservoirs 4a so as to put the heater devices 3a into contact with the solution. In this manner, the surfaces of the heater devices 3a can be treated with the solution by heating the heater devices 3a. The surface-treating solution is preferably an aqueous solution containing 0.05 to 10 percent by weight, and more preferably 0.1 to 5 percent by weight of the organic phosphonic compound of formula (1). A water-soluble organic solvent, such as isopropyl alcohol or glycerol, may be added to the surface-treating solution, if necessary.

Alternatively, the surface-treating solution may be charged into the ink reservoirs 4a of the inkjet recording head 1 before use, i.e., before mounting an ink cassette. The surfaces of the heater devices 3a can be treated by performing normal discharge operation. This relates to a method for treating an inkjet recording head.

A thermal inkjet printer can be made by combining the inkjet recording head of the present invention with other components which have been conventionally available. Since this printer uses the inkjet recording head of the present invention, kogation at the surfaces of the heater devices can be prevented, deposition can be suppressed, and a high ink-ejection rate can be maintained for a long time. Moreover, high quality images can be produced since ink droplets can be ejected smoothly.

The operation of the thermal inkjet printer using the inkjet recording head of the present invention is as follows. Ink supplied from the ink tank 7 to the ink-supply slit 2a flows via the ink paths 4b to the ink reservoirs 4a. The nozzles 5a usually have a circular cross-section, and the center of the ink surface at the front end of each nozzle 5a is recessed by the negative pressure, thereby forming a meniscus. When a driving voltage is applied to the heater device 3a, the heater device 3a generates heat to locally heat the ink. In the inkjet recording head 1, nucleating bubbles are produced by the heat, and the bubbles combine to form a film bubble, which increases the pressure applied to the ink. As a result, ink droplets are ejected out of the nozzles 5a, land on the paper for inkjet recording, and are affixed thereon, thereby forming ink images on the paper.

Note that in this embodiment, any conventional ink for inkjet printing can be used.

EXAMPLES

The second embodiment of the present invention will now be described by way of EXAMPLES.

Example 5

A surface-treating solution for treating the surface of the heater device was prepared by dissolving 0.05 percent by weight of the organic phosphonic compound of formula (1), i.e., Chelest PH430 manufactured by Chelest Corporation, into water. The surface-treating solution was fed to the ink reservoir of an unused inkjet recording head mounted into an inkjet printer, MPR-501 manufactured by Sony Corporation, to treat the surface of the heater device.

Example 6

A surface-treating solution was prepared as in EXAMPLE 5 but with 0.1 percent by weight of the organic phosphonic compound of formula (1), i.e., Chelest PH430 manufactured by Chelest Corporation, dissolved in water. The surface of the heater device was treated with the surface-treating solution.

Example 7

A surface-treating solution was prepared as in EXAMPLE 5 but with 5.0 percent by weight of the organic phosphonic compound of formula (1), i.e., Chelest PH430 manufactured by Chelest Corporation, dissolved in water. The surface of the heater device was treated with the surface-treating solution.

Example 8

A surface-treating solution was prepared as in EXAMPLE 5 but with 10.0 percent by weight of the organic phosphonic compound of formula (1), i.e., Chelest PH430 manufactured by Chelest Corporation, dissolved in water. The surface of the heater device was treated with the surface-treating solution.

Reference Example 1

A surface-treating solution was prepared as in EXAMPLE 5 but with 0.01 percent by weight of the organic phosphonic compound of formula (1), i.e., Chelest PH430 manufactured by Chelest Corporation, dissolved in water. The surface of the heater device was treated with the surface-treating solution.

Evaluation

Ink A and ink B shown in Tables 8 and 9 and a commercially available ink C (PM750C, Seiko Epson Corporation) were supplied to the inkjet recording heads of EXAMPLES 5 to 8 and REFERENCE EXAMPLE 1 and to an ink-jet recording head whose heater device was not surface-treated with the organic phosphonic compound of formula (1), i.e., Chelest PH430 manufactured by Chelest Corporation. The inkjet recording heads were respectively mounted into an inkjet printer (MPR-501, manufactured by Sony Corporation), and inkjet printing was performed using inkjet recording paper (PM Photopaper manufactured by Seiko Epson Corporation).

TABLE 8

Ink A

| Component | wt % |
|---|---|
| Dye (Magenta VPSP25005, manufactured by Bayer) | 4 |
| Ethylene glycol | 10 |
| Glycerol | 10 |
| Water | 76 |

TABLE 9

Ink B

| Component | wt % |
|---|---|
| Dye (Acid Red 289 (J-41A, manufactured by Nippon | 4 |
| Ethylene glycol | 10 |
| Diethylene glycol | 5 |
| Glycerol | 10 |
| Water | 71 |

The rate of ejecting ink droplets at an early stage of the ejection and that after 100,000,000 pulses were determined so as to calculate the change in ejection rate, i.e., a decrease in ejection rate (%). The results are shown in Table 10.

The surface of the heater device after 100,000,000 ejection pulses was observed with an optical microscope to inspect the presence of deposits, i.e., the state of kogation. The state in which substantially no deposits were found on the heater device surface was rated "excellent" (denoted as EX in the table). The state in which few deposits were found on the surface was rated "fair" (denoted as F in the table). The state in which a substantial amount of deposits were found on the surface was rated "poor" (denoted as P in the table). The ratings are shown in Table 10. The thickness of the deposits on the surface of the heater device was determined with a color laser microscope (trade name: VK-8500, available from Keyence Corporation). The results are shown in Table 10.

TABLE 10

| | Decrease in ejection rate (%) | | | Deposits | | | | | |
|---|---|---|---|---|---|---|---|---|---|
| | | | | Rating | | | Thickness (μm) | | |
| Ink | A | B | C | A | B | C | A | B | C |
| EXAMPLE 5 | 20 | 18 | 20 | F | F | F | 0.85 | 0.8 | 0.85 |
| EXAMPLE 6 | 16 | 15 | 17 | EX | EX | EX | 0.7 | 0.5 | 0.7 |
| EXAMPLE 7 | 5 | 5 | 5 | EX | EX | EX | 0.2 | 0.2 | 0.2 |
| EXAMPLE 8 | 2 | 2 | 2 | EX | EX | EX | 0.1 | 0.1 | 0.1 |
| REFERENCE EXAMPLE 1 | 40 | 30 | 40 | P | P | P | 1.0 | 0.9 | 1.0 |
| COMPARATIVE EXAMPLE | 50≦ | 50 | 50≦ | P | P | P | 1.5 | 1.3 | 1.5 |

As shown in Table 10, the change in ejection rate of the inkjet recording heads of EXAMPLES 5 to 8 preliminarily treated with the organic phosphonic compound of formula (1) was at a practical level, i.e., 20% at most, after application of 100,000,000 pulses. The thickness of the deposits on the surface of the heater device was 0.85 μm or less, which is significantly small. In particular, only small amounts of deposits were observed in EXAMPLE 5. Substantially no deposits were observed in EXAMPLES 6, 7, and 8. In EXAMPLES 6, 7, and 8, the surface of the heater device was colored.

REFERENCE EXAMPLE 1 and EXAMPLE 5 show that the organic phosphonic compound content in the surface-treating solution is preferably at least 0.05 percent by weight.

In contrast, an inkjet recording head of the COMPARATIVE EXAMPLE having heater devices whose surfaces were not treated with the organic phosphonic compound of formula (1) exhibited a change in ejection rate exceeding 20% after application of 100,000,000 pulses. This decrease in ejection rate is so large that the inkjet recording head cannot be used in practical applications. Moreover, the thickness of the deposits on the heater devices was excessively large, i.e., more than 0.85 μm.

What is claimed is:

1. A method for treating an inkjet recording head comprising a reservoir for accommodating an ink, a heater device, and a nozzle; the inkjet recording head being capable of ejecting the ink in the reservoir from the nozzle by heat applied from the heater device, the method comprising:

introducing a surface-treating solution containing an organic phosphonic compound into the reservoir while the reservoir is not filled with the ink so as to cause the heater device to be in contact with the surface-treating solution, the organic phosphonic compound being represented by the formula:

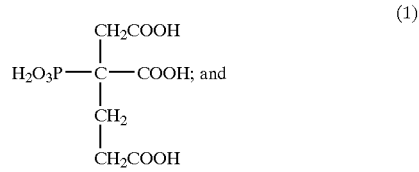

heating the heater device so that the surface of the heater device is treated with the organic phosphonic compound.

2. An inkjet printer comprising an inkjet recording head treated by the method of claim 1.

* * * * *